(12) United States Patent
Koo et al.

(10) Patent No.: US 9,853,836 B2
(45) Date of Patent: Dec. 26, 2017

(54) APPARATUS AND METHOD FOR SIGNAL DETECTION IN A WIRELESS COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Jihun Koo, Gyeonggi-do (KR); Hyunsub Kim, Seoul (KR); Hyukyeon Lee, Gangwon-do (KR); Jaeseok Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/280,512

(22) Filed: Sep. 29, 2016

(65) Prior Publication Data

US 2017/0118045 A1    Apr. 27, 2017

(30) Foreign Application Priority Data

Oct. 21, 2015    (KR) .................. 10-2015-0146640

(51) Int. Cl.
| | |
|---|---|
| *H04B 1/16* | (2006.01) |
| *H04L 25/02* | (2006.01) |
| *H04B 7/0413* | (2017.01) |
| *H04B 1/7107* | (2011.01) |
| *H04W 8/00* | (2009.01) |

(52) U.S. Cl.
CPC ..... *H04L 25/0256* (2013.01); *H04B 1/71072* (2013.01); *H04B 7/0413* (2013.01); *H04L 25/0262* (2013.01); *H04W 8/005* (2013.01)

(58) Field of Classification Search
CPC ............ H04L 25/0256; H04L 25/0262; H04B 7/0413; H04B 1/71072; H04W 8/005
USPC ....... 375/259, 260, 267, 268, 316, 340, 341, 375/349; 455/334, 337
See application file for complete search history.

(56) References Cited

U.S. PATENT DOCUMENTS

| | | | |
|---|---|---|---|
| 6,724,843 B1 | 4/2004 | Clarkson et al. | |
| 7,720,169 B2 | 5/2010 | Reuven et al. | |
| (Continued) | | | |

FOREIGN PATENT DOCUMENTS

KR      1020080042383      5/2008

OTHER PUBLICATIONS

IEEE Std 802.11—2012, Part 11: Wireless LAN Medium Access Control (MAC) and Physical Layer (PHY) Specifications, pp. 2,793.

(Continued)

*Primary Examiner* — Siu Lee
(74) *Attorney, Agent, or Firm* — The Farrell Law Firm, P.C.

(57) ABSTRACT

An electronic device and method for signal detection in a wireless communication system is provided. The electronic device includes a receiving unit configured to receive a radio frequency (RF) signal, a control unit configured to process the received signal, wherein processing the received signal comprises canceling a signal corresponding to a first stage in the received signal, detecting a signal corresponding to a second stage by applying lattice reduction, and determining a final detected signal by combining the detected signal corresponding to the second stage with candidates of the signal corresponding to the first stage.

20 Claims, 11 Drawing Sheets

(56) References Cited

U.S. PATENT DOCUMENTS

| | | | |
|---|---|---|---|
| 8,117,522 B2 | 2/2012 | Kim et al. | |
| 8,270,506 B2 | 9/2012 | Rog et al. | |
| 8,290,096 B2 | 10/2012 | Shim et al. | |
| 8,346,175 B2* | 1/2013 | Milliner | H04L 1/206 |
| | | | 455/63.1 |
| 8,462,867 B2 | 6/2013 | van Zelst et al. | |
| 8,873,613 B2 | 10/2014 | Aubert | |
| 2007/0206697 A1* | 9/2007 | Qiu | H04L 27/38 |
| | | | 375/267 |
| 2008/0013444 A1 | 1/2008 | Sandell | |
| 2008/0049863 A1* | 2/2008 | Heiskala | H04L 1/06 |
| | | | 375/267 |
| 2009/0003476 A1* | 1/2009 | Rog | H04L 25/0204 |
| | | | 375/260 |
| 2009/0196360 A1 | 8/2009 | Gan et al. | |
| 2009/0252242 A1* | 10/2009 | Kim | H03M 13/29 |
| | | | 375/260 |
| 2012/0269302 A1* | 10/2012 | Ancora | H04L 1/0606 |
| | | | 375/340 |
| 2014/0185716 A1* | 7/2014 | Aubert | H04L 25/03216 |
| | | | 375/341 |
| 2014/0254727 A1* | 9/2014 | Kim | H04B 7/0417 |
| | | | 375/340 |
| 2016/0254939 A1* | 9/2016 | Miyazaki | H04L 27/3416 |

OTHER PUBLICATIONS

Gan, Ying Hung et al., Complex Lattice Reduction Algorithm for Low-Complexity MIMO Detection, IEEE Transactions on Signal Processing (vol. 57, Issue: 7, Jul. 2009), pp. 9.

Shabany Mahdi et al., The Application of Lattice-Reduction to the K-Best Algorithm for Near-Optimal MIMO Detection, Copyright 2008 IEEE, pp. 316-319.

Barbero, Luis G. et al., Fixing the Complexity of the Sphere Decoder for MIMO Detection, IEEE Transactions on Wireless Communications, vol. 7, No. 6, Jun. 2008, pp. 2131-2142.

* cited by examiner

APPARATUS AND METHOD FOR SIGNAL DETECTION IN A WIRELESS COMMUNICATION SYSTEM

PRIORITY

This application claims priority under 35 U.S.C. §119(a) to Korean Patent Application Serial No. 10-2015-0146640, which was filed in the Korean Intellectual Property Office on Oct. 21, 2015, the entire disclosure of which is incorporated herein by reference.

BACKGROUND

1. Field of the Disclosure

The present disclosure relates generally to an apparatus and method for detecting a received signal with high performance and low complexity in a multiple-input multiple-output (MIMO) system.

2. Background of the Related Art

A multiple-input multiple-output (MIMO) system may achieve large data transfer by employing a MIMO technique to an existing wireless communication system using multiple transmit antennas and multiple receive antennas for wireless data delivery. The MIMO system detects a signal received over multiple channel paths based on channel estimation information of a receiver end, and requires the signal detection have high performance and low complexity by using an efficient algorithm. Among conventional detection methods, a maximum likelihood (ML) scheme may produce optimal performance, but it is difficult to realize the ML scheme because of high algorithmic complexity. Various algorithms such as sphere decoder (SD) and K-best are alternatives, but their complexity is variable and their performance degrades in a high-order MIMO system. A fixed-complexity sphere decoder (FSD) algorithm produces a quasi-ML optimal performance with fixed complexity. However, when the number of antennas and modulation order increase, a full expansion (FE) stage for generating and expanding all of the available candidate vectors increases and thus, the complexity of the FSD algorithm rises.

To overcome the complexity drawback of MIMO detection, a conventional method inserts lattice reduction to preprocessing. The lattice reduction is used in association with a simple linear or successive interference cancellation (SIC) detector and may improve the performance with low additional complexity. However, the lattice reduction-aided algorithm combined with the linear and SIC detector may degrade in performance as the number of antennas increase. In this respect, a lattice reduction (LR) K-best combines the LR with K-best which is a tree-type algorithm. Similar to the K-best, the LR K-best requires additional computation in the sorting-process of every stage and the performance may degrade in a high-order system.

SUMMARY

Accordingly, an aspect of the present disclosure provides an apparatus and method to maintain optimal receiver performance in a high-order MIMO system and achieve low algorithm complexity by reducing the number of candidate vectors, combining with the LR, and adopting a minimum-mean square error (MMSE) signal model.

Another aspect of the present disclosure provides an apparatus and method are provided for detecting and cancelling a signal corresponding to a first stage in a received signal, and detecting a signal corresponding to a second stage by applying lattice reduction.

Another aspect of the present disclosure provides an apparatus and method for determining a final detected signal among signal candidates obtained using a full expansion stage and a single expansion stage.

Another aspect of the present disclosure provides an apparatus and a method for dividing a first stage and a second stage in a received signal.

Another aspect of the present disclosure provides an apparatus and a method for determining a first stage.

Another aspect of the present disclosure provides an apparatus and a method for determining the number of first stages.

Another aspect of the present disclosure provides an apparatus and a method for reducing the number of first stages and maintaining a performance level.

According to an aspect of the present disclosure, a method includes canceling a signal corresponding to a first stage in the received signal, and detecting a signal corresponding to a second stage by applying lattice reduction.

According to another aspect of the present disclosure, an electronic device includes a receiving unit for receiving a radio frequency (RF) signal and a control unit for processing the received signal. The control unit detects and cancels a signal corresponding to a first stage in the received signal, and detects a signal corresponding to a second stage by applying lattice reduction.

BRIEF DESCRIPTION OF THE DRAWINGS

The above and other aspects, features, and advantages of embodiments of the present disclosure will be more apparent from the following description taken in conjunction with the accompanying drawings, in which.

DETAILED DESCRIPTION

Figure 1:
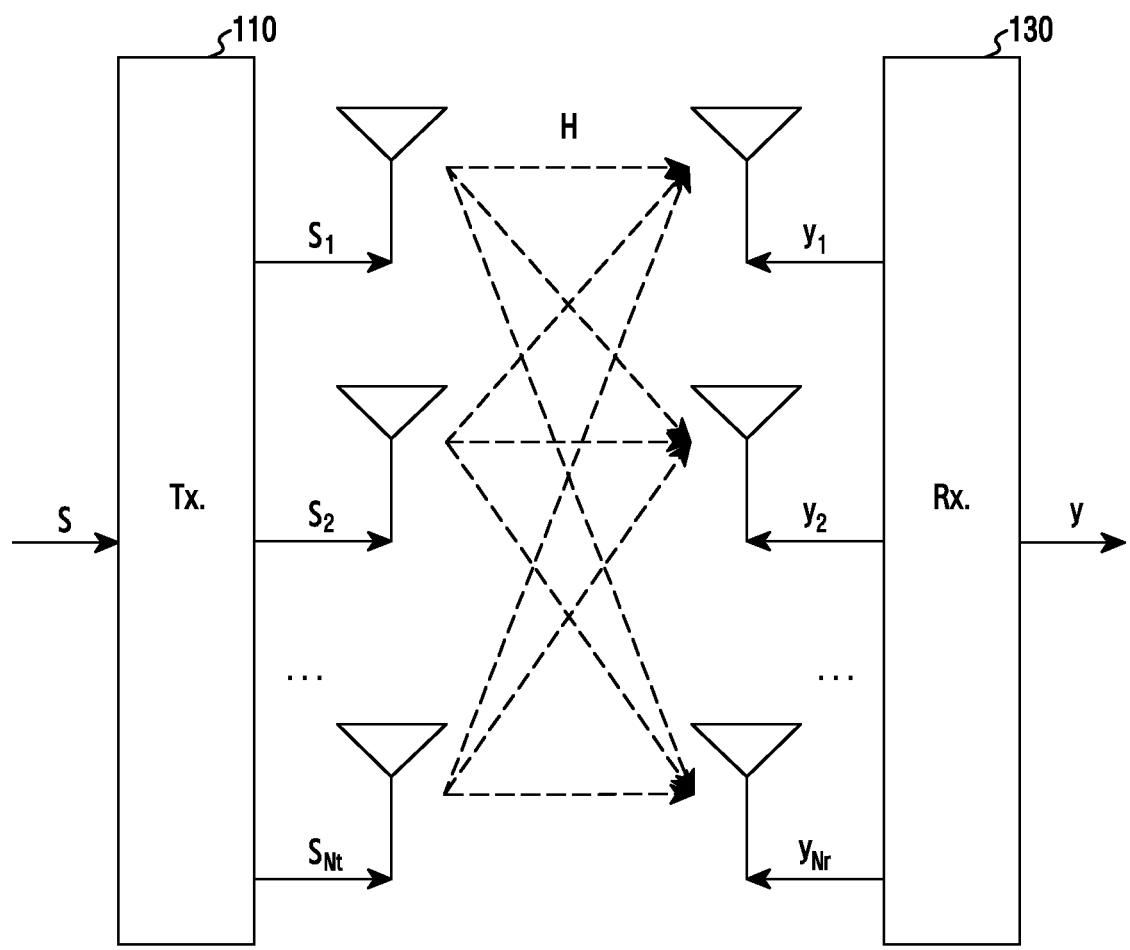
FIG. 1 is a diagram of a multiple-input multiple-output (MIMO) system, according to an embodiment of the present disclosure.

The following description with reference to the accompanying drawings is provided to assist in a comprehensive understanding of embodiments of the present disclosure as defined by the claims and their equivalents. The description includes various specific details to assist in the understanding, but these are to be regarded as mere examples. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness. In describing the drawings, similar reference numerals may be used to designate similar elements.

Terms such as "part" and "unit" indicate a unit for processing at least one function or operation, and may be realized using hardware, software, or a combination of hardware and software.

FIG. 1 is a diagram of a multiple-input multiple-output (MIMO) system, according to an embodiment of the present disclosure.

Wireless communications require high data rate and high performance. A MIMO antenna system may achieve higher spectral efficiency in an allocated radio frequency (RF) channel bandwidth by using spatial or antenna diversity in a transceiver. A plurality of data streams is individually mapped and modulated in the MIMO system before they are precoded and transmitted via physical antennas. The data streams are transmitted over the air and received at multiple antennas of a receiver.

Referring to FIG. 1, a transmitter may transmit a signal over Nr-ary antennas and a receiver may receive the signal over Nt-nary antennas. The system model of FIG. 1 may be expressed in Equation (1).

$$y = Hs + n = \sum_{l=1}^{N_T} h_l s_l + n \quad (1)$$

in which y denotes a receive signal vector received at the antenna, s denotes a transmit symbol vector, H denotes a fading channel matrix, $N_T$ denotes the number of antennas in the receiver, and n denotes a Gaussian noise. The fading channel matrix H may include an Nr by Nt matrix.

Equation (1) may be divided into a real number part and an imaginary number part according to real value decomposition (RVD) as expressed in Equation (2).

$$\underbrace{\begin{bmatrix} \Re(y) \\ \Im(y) \end{bmatrix}}_{y_r} = \underbrace{\begin{bmatrix} \Re(H) & -\Im(H) \\ \Im(H) & \Re(H) \end{bmatrix}}_{H_r} \underbrace{\begin{bmatrix} \Re(s) \\ \Im(s) \end{bmatrix}}_{s_r} + \underbrace{\begin{bmatrix} \Re(n) \\ \Im(n) \end{bmatrix}}_{n_r} \quad (2)$$

Matrixes converted to the real numbers according to the RVD in Equation (2) may be defined as $y_r$, $H_r$, $s_r$, and $n_r$, respectively. Hardware implementations may be facilitated by expressing and calculating Equation 1 in a real-numbered domain using the RVD. The RVD may increase flexibility in selecting the number of full expansion stages. That is, it should be understood that the RVD is not required, but optional, in the hardware implementation of the MIMO system.

Figure 2:
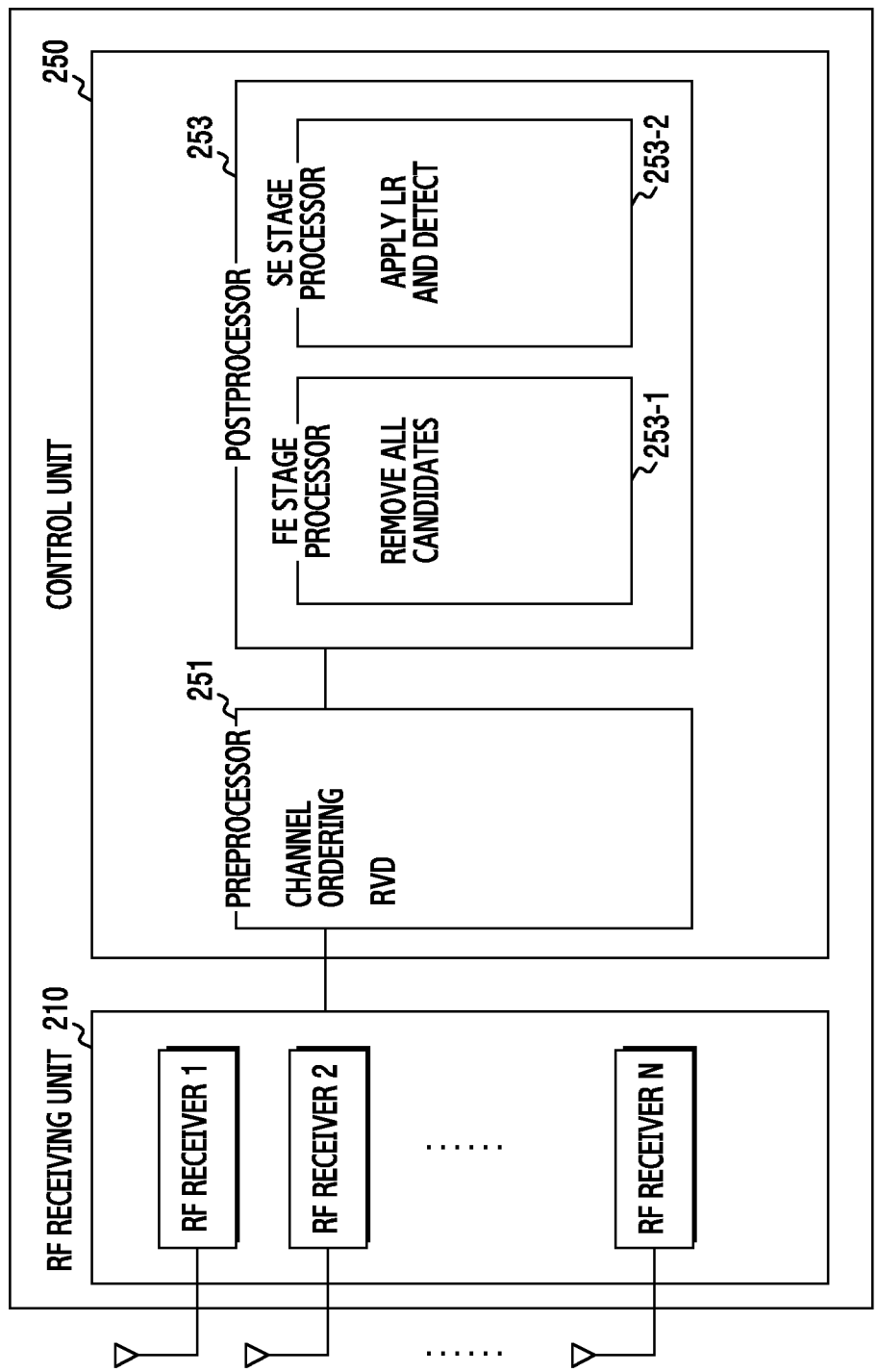
FIG. 2 is a block diagram of an electronic device in a MIMO system, according to an embodiment of the present disclosure.

FIG. 2 is a block diagram of an electronic device in a MIMO system, according to an embodiment of the present disclosure.

Referring to FIG. 2, the electronic device includes an RF receiving unit 210 for sending and receiving RF signals, a preprocessor 251 for preprocessing the received signal detection, and a postprocessor 253 for detecting the preprocessed receive signal. The preprocessor 251 and the postprocessor 253 may be referred to as the control unit 250.

The RF receiving unit 210 of the electronic device for supporting the MIMO system may include RF receiver 1 through RF receiver N. That is, the RF receiving unit 210 of the electronic device may include a plurality of RF receivers (e.g., antennas). The RF receiver 1 through the RF receiver N may transmit and receive signals through their allocated channel path. The RF receiving unit 210 may correspond to the receiver 130 of FIG. 1.

The preprocessor 251 may perform channel ordering and RVD as the preprocessing of signal detection. The channel ordering is conducted in a descending order of reliability in a full expansion (FE) stage, and in an ascending order of reliability in a single expansion (SE) stage in order to minimize error propagation. The RVD may facilitate hardware implementation by expressing and calculating Equation (1) in the real-number domain. The RVD may be fulfilled based on Equation (2). The RVD may improve the flexibility in selecting the number of FE stages.

The postprocessor 253 may detect the received signal and include an FE stage processor 253-1 and an SE stage processor 253-2. The FE stage and the SE stage may be referred to as a first stage and a second stage respectively. The FE stage processor 253-1 may detect and cancel a signal corresponding to the first stage in the received signal. More specifically, the FE stage processor 253-1 may expand and cancel all of the signals corresponding to the first stage in the received signal processed by the preprocessor 251. This is because a symbol constellation domain is moved to an LR domain, after the LR, and thus it is difficult to generate candidate vectors unlike the traditional FSD algorithm. That is, after the LR is applied, a conventional tree search may be impracticable.

After the signal corresponding to the first stage is removed from the received signal, the SE stage processor 253-2 may apply the LR to a signal corresponding to the second stage. The LR may convert a column vector which is a basis vector of a lattice space, to a basis vector of favorable properties (such as orthogonality). That is, the LR may make the basis vectors orthogonal and thus a Euclidean space may be expanded. As the Euclidean space is expanded, a maximum noise range without errors may expand. As a result, the LR may improve reliability of the detected signal.

According to an embodiment of the present disclosure, a linear detection scheme may be employed to detect the signal corresponding to the second stage. A minimum-mean square error (MMSE)-successive interference cancellation (SIC) algorithm may also be adopted to detect the signal corresponding to the second stage.

Figure 3:
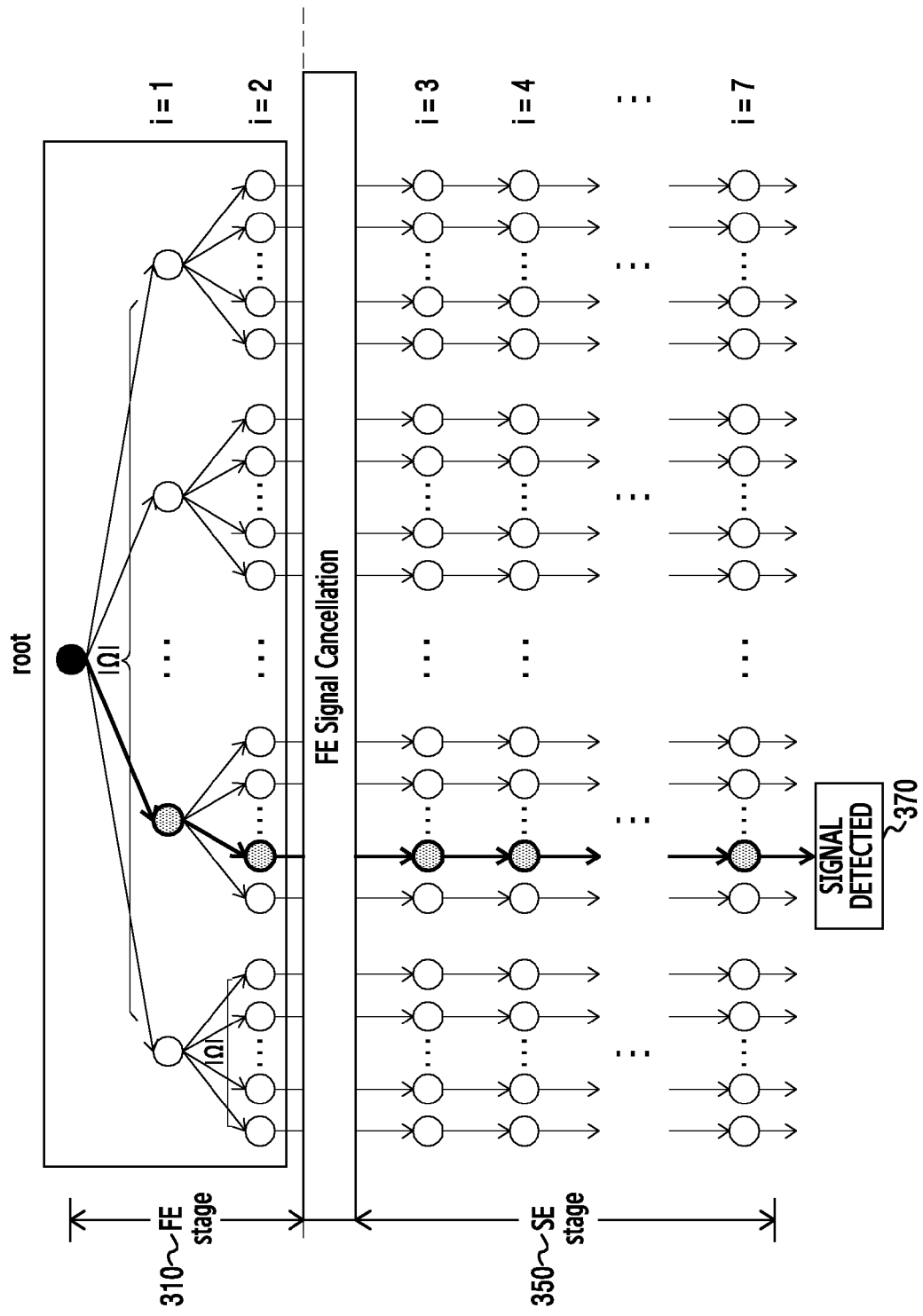
FIG. 3 is a diagram of received signal detection in a MIMO system, according to an embodiment of the present disclosure.

To detect a final signal, the detected signal corresponding to the second stage may be combined with candidates of the signal corresponding to the first stage and thus candidates of the final detected signal may be generated. FIG. 3 depicts candidates of the final detected signal. One of the generated candidates of the final detected signal may be determined based on Equation (3).

$$s_D = \operatorname*{argmin}_{s \in |\Phi|} \|y - Hs\|^2 \qquad (3)$$

$|\Phi|$ denotes the candidates of the final detected signal acquired through the detection method, and $S_D$ denotes a final determined vector acquired through the detection method based on Equation 3. That is, the control unit 250 measures Euclidean distances from a received signal y based on Equation 3 with respect to the candidates $|\psi|$ acquired through the FE stage and the SE stage. The control unit 250 determines the signal candidate of the shortest Euclidean distance measured, as the signal vector. The control unit 250 determines the final detected signal (or the transmitted signal received by the receiving unit 210) from the final candidates. The final detected signal 370 of FIG. 3 is selected from the generated signal candidates based on Equation (3).

FIG. 3 is a diagram of received signal detection in a MIMO system, according to an embodiment of the present disclosure.

For effective received signal detection to occur, channel ordering may precede detection. More specifically, the channel ordering is conducted in descending order of reliability in the FE stage, and in ascending order of reliability in the SE stage in order to minimize any error propagation. For example, referring to FIG. 3, the channel ordering may be conducted in descending order of reliability at i=1 and i=2 corresponding to the FE stage, and in ascending order of reliability at i=2 and i=n corresponding to the SE stage. Herein, the channel ordering may be carried out based on Equation (4).

$$m = \begin{cases} \operatorname*{argmax}_{l} \left\| ((H_r)_l^{\dagger})_i \right\|^2, & \text{if } n_i \in FE \text{ stage} \\ \operatorname*{argmax}_{l} \left\| ((H_r)_l^{\dagger})_i \right\|^2, & \text{if } n_i \in FE \text{ stage} \end{cases} \qquad (4)$$

$H_i$ denotes a channel matrix with the previously ordered column removed, and $H_i^{\dagger} = (H_i^H H_i)^{-1} H_i^H$ denotes pseudo-inverse computation. In the stage corresponding to the FE stage, a channel path is selected in descending order of poor environment. That is, the stage i=1 through the stage i=2 are ordered in descending order of poor channel quality in FIG. 3. Next, in the stage corresponding to the SE stage, a channel path is selected in descending order of good environment. That is, the stage i=3 through the stage i=n are ordered in descending order of good channel quality in FIG. 3. K-ary FE stages 310 may be determined from the first stages corresponding to the FE stage, that is, from the stages corresponding to i=1 and i=2. The k-ary FE stages 310 may be determined from the top stage, that is, the stage corresponding to i=1. According to an embodiment of the present disclosure, the FE stages 310 include the two stages i=1 and i=2 in FIG. 3. The number of FE stages 310 may vary based on the number of transmit and receive antennas. However, a MIMO system with a high order and many antennas needs FE stages 310 over a certain number for increasing detected signal reliability. The number of FE stages 310 may be defined based on Equation (5).

$$(n_R - n_T)(p+1) + (p+1)^2 \geq n_R \qquad (5)$$

$n_R$ denotes the number of transmit antennas and $n_T$ denotes the number of receive antennas. p denotes the minimum number of FE stages 310 satisfying Equation (5). p is an integer greater than or equal to 1.

In the FE stage 310, all of the signal candidate vectors are expanded, detected, and then removed. Since a poor channel quality path corresponds to the FE stage 310 according to the channel ordering, all of the signal candidate vectors are expanded, detected, and then removed in order to improve the reliability of the detected signal.

The signal corresponding to the FE stage 310 may be removed from the received signal based on Equation (6).

$$y' = y - h_{N_t} s_{N_t} = H's' \qquad (6)$$

y denotes the received signal, $h_{N_t}$ denotes a channel vector corresponding to the FE stage 310, and $s_{N_t}$ denotes the detected signal, to be removed, corresponding to the FE stage 310. y' denotes a signal after removing the signal corresponding to the FE stage 310 from the received signal, and H' and s' denote a channel matrix and a transmit signal vector respectively, after removing the signal corresponding to the FE stage 310. According to an embodiment of the present disclosure, when a 4 by 4 MIMO system includes a single FE stage 310, and cancels the signal corresponding to the FE stage 310 based on Equation (6), the channel matrix H' becomes 4 by 3. When an 8 by 8 MIMO system includes two FE stages 310 and cancels the signal corresponding to the FE stage 310 based on Equation (6), the channel matrix H' becomes 8 by 6.

Prior to the LR, all of the signals corresponding to the FE stage 310 are expanded and removed. Since the symbol constellation domain is moved to the LR domain after the LR, it may be difficult to generate candidate vectors unlike the conventional FSD algorithm.

Thus, after cancelling the signals corresponding to the FE stage 310, the LR may be conducted based on Equation (6) so as to detect the signal corresponding to the SE stage 350. The LR may enhance orthogonality of basis vectors of the channel matrix, reduce noise enhancement, and obtain an additional diversity. The system model after the LR based on Equation (6), in which the signals corresponding to the FE stage 310 are cancelled in the received signal, may be expressed as Equation (7).

$$y'_{(k)} \triangleq H's'_{(k)} = H'TT^{-1}s'_{(k)} = \tilde{H}'z_{(k)},$$

$$\text{where, } \tilde{H}' = H'T, z_{(k)} = T^{-1}s'_{(k)}. \qquad (7)$$

$\tilde{H}'$ denotes a lattice-reduced channel matrix using the LR algorithm, and $z_{(k)}$ denotes a transmit signal moved to the LR domain. The transmit signal $z_{(k)}$ of the LR domain includes the removed signal corresponding to the FE stage 310.

Figure 4:
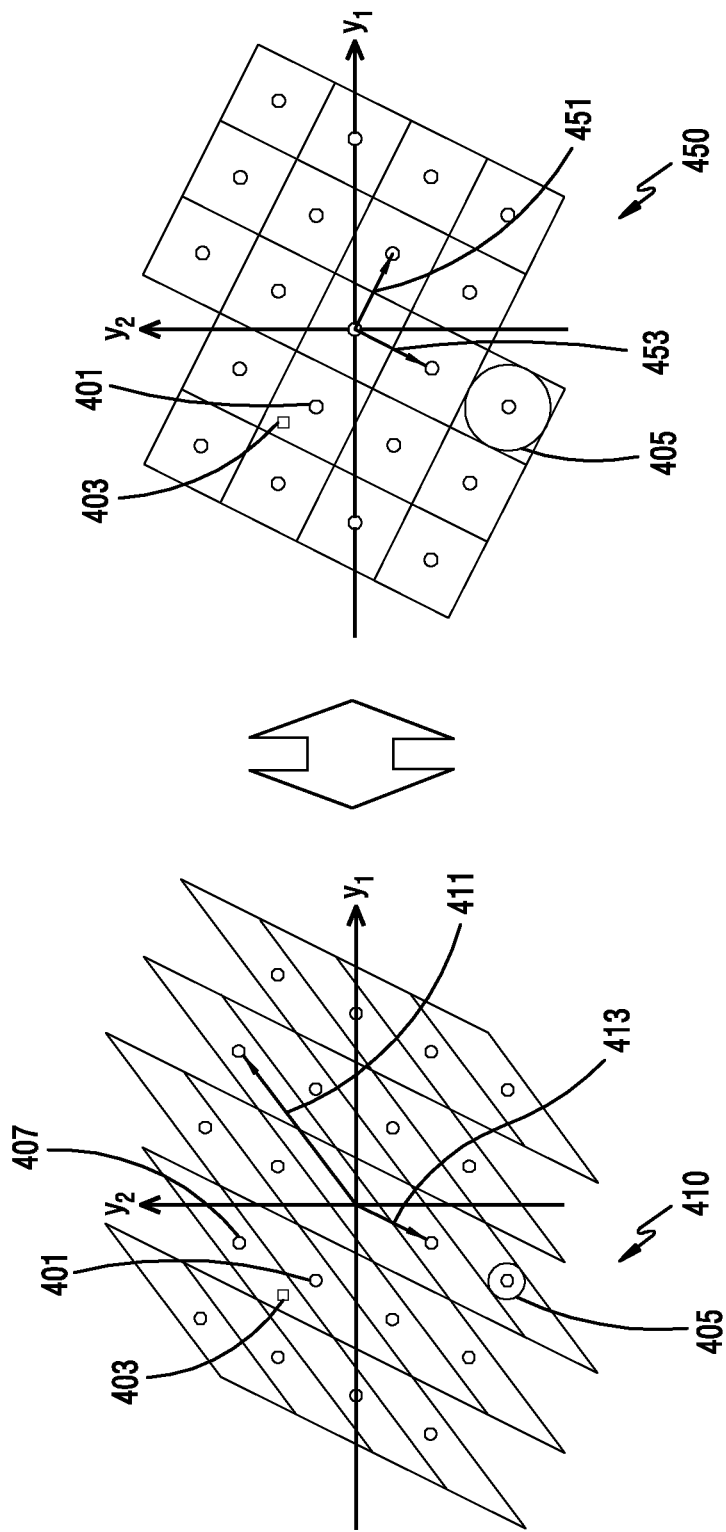
FIG. 4 is a diagram for illustrating a lattice reduction, according to an embodiment of the present disclosure.

FIG. 4 is a diagram for illustrating a lattice reduction (LR), according to an embodiment of the present disclosure.

Referring to FIG. 4, a detection scheme 410 applies no LR and a detection scheme 450 applies the present LR. The LR may perform the detection by converting the column vector which is the basis vector of the lattice space, to the basis vector with favorable properties (such as orthogonality). That is, basis vectors 411 and 413 of the detection 410 are not orthogonal in FIG. 4, whereas basis vectors 451 and 453 of the LR-aided detection 450 are orthogonal. While a transmit signal 401 and a received signal 403 are not in the same quadrangle according to LR-unaided detection 410, the transmit signal 401 and the received signal 403 are in the same quadrangle according to LR-aided detection 450. Disadvantageously, the LR-unaided detection 410 erroneously detects a signal 407 as the transmit signal since the received signal 403 is placed in the same quadrangle as the signal 407 according to the LR-unaided detection 410. By contrast, the LR-aided detection 450 may detect a signal 401 in the same quadrangle as the received signal 403, as the transmit signal. In other words, a maximum noise range without errors corresponding to a Euclidean space 405 may expand. That is, referring to FIG. 4, the LR-aided detection 450 has the greater Euclidean space 405 than the LR-unaided detection 410, increasing the permissible noise level, and thus becoming more tolerant to the noise.

Figure 5:
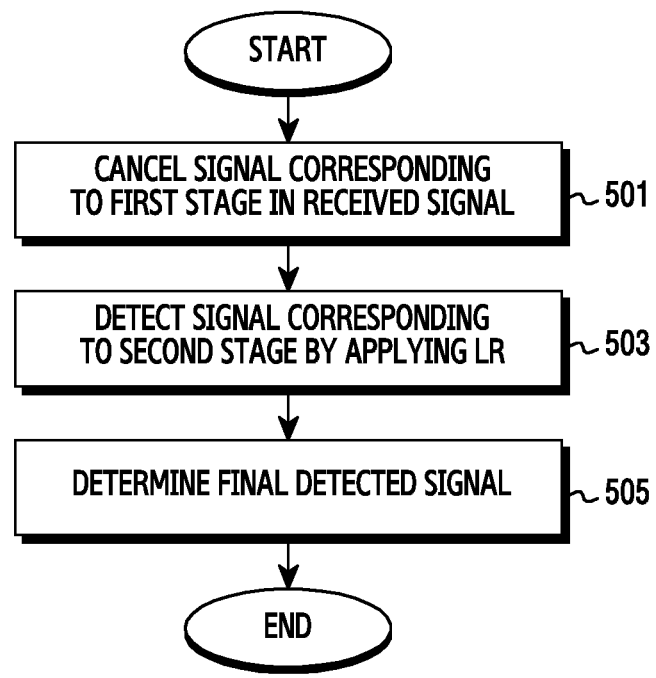
FIG. 5 is a flowchart of a signal detection method in a MIMO system, according to an embodiment of the present disclosure.

FIG. 5 is a flowchart of a signal detection method in a MIMO system according to an embodiment of the present disclosure. The method of FIG. 5 may be carried out by the control unit 250 of FIG. 2.

An electronic device including a plurality of receive antennas cancels a signal corresponding to a first stage in a received signal in step 501. Herein, the first stage corresponds to the FE stage 310 of FIG. 3. More specifically, the electronic device may perform the channel ordering on the signal received via the multiple antennas, and then expand and remove all of the signals corresponding to the first stage. Herein, the channel ordering may be conducted based on Equation (4) above. The signal corresponding to the first stage may be removed based on Equation (6) above. All of the signals corresponding to the first stage are expanded and removed because the symbol constellation domain is moved to the LR domain after the LR application, and it is difficult to generate candidate vectors unlike the traditional FSD algorithm. That is, after the LR, the conventional tree search may be impractical.

In step 503, the electronic device detects a signal corresponding to a second stage by applying the LR. Herein, the second stage corresponds to the SE stage 350 of FIG. 3. The LR may be conducted based on Equation (7) above. The LR may convert the column vector, which is the basis vector of the lattice space, to the basis vector with favorable properties, such as orthogonality. That is, the LR may make the basis vectors orthogonal and thus the Euclidean space may be expanded. As the Euclidean space is expanded, a maximum noise range without errors may expand. As a result, the LR may improve the reliability of the detected signal corresponding to the second stage. According to an embodiment of the present disclosure, the linear detection scheme may be applied to detect the signal corresponding to the second stage. The MMSE-SIC scheme may be applied to detect the signal corresponding to the second stage.

In step 505, the electronic device determines a final detected signal. To determine a final detected signal, the electronic device may generate candidates of the final detected signal by combining the signal corresponding to the second stage detected in step 503 with candidates of the signal corresponding to the first stage. The candidates of the final detected signal may be generated as shown in FIG. 3. The electronic device may measure the Euclidean distances between the candidates of the final detected signal and the received signal, and determine the candidate with the shortest Euclidean distance as the final detected signal. The final detected signal may be selected from the candidates based on Equation (3) above.

Figure 6:
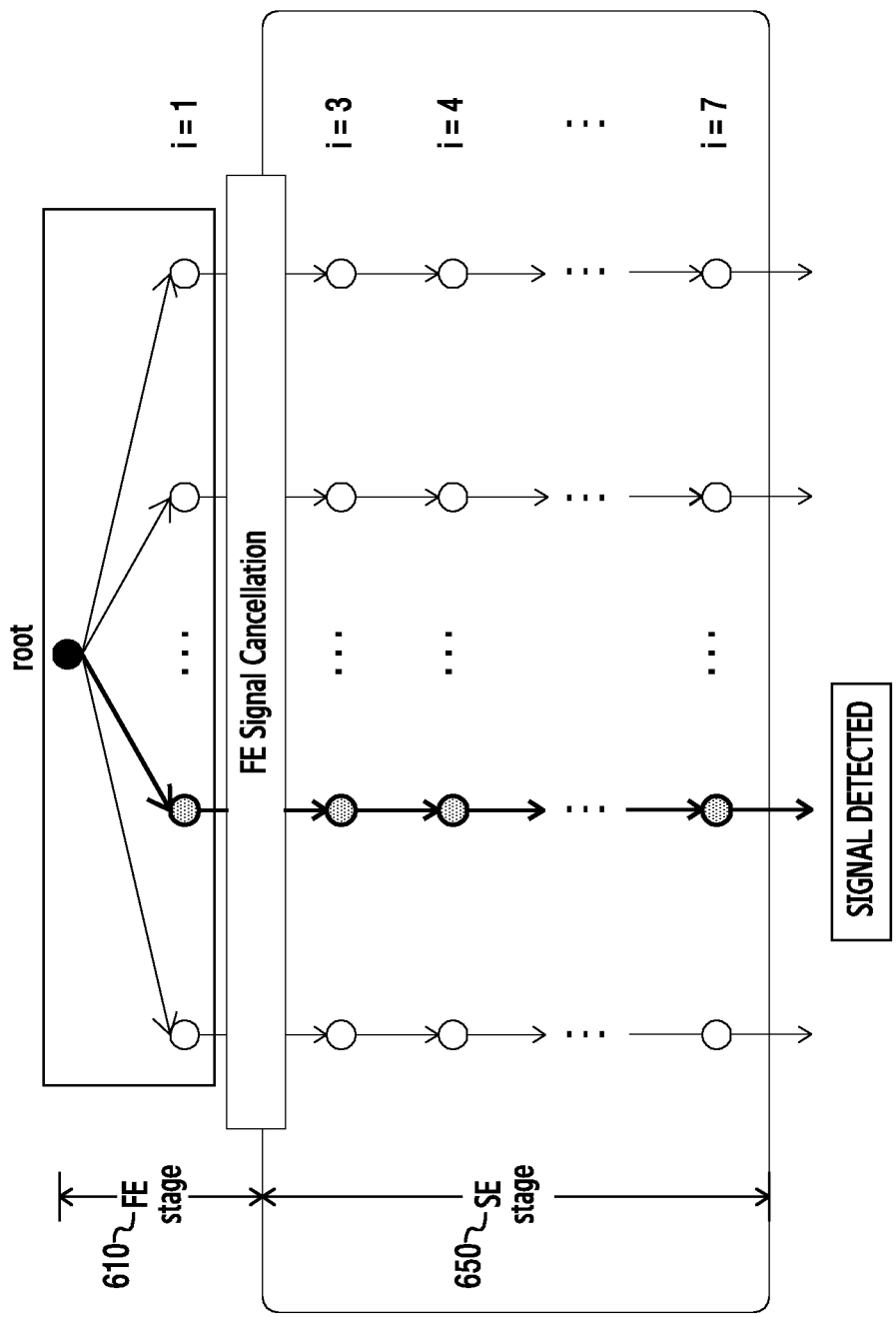
FIG. 6 is a diagram of signal detection when the number of first stages decreases in a MIMO system, according to an embodiment of the present disclosure.

FIG. 6 is a diagram of signal detection when the number of first stages decreases in a MIMO system, according to an embodiment of the present disclosure.

Referring to FIG. 6, compared with FIG. 3, the number of first stages, that is, the number of the FE stages 310 is reduced from two to one.

To assist in the understanding of the present disclosure, it is assumed that, but not limited to, an 8 by 8 MIMO system includes eight transmit antennas and eight receive antennas. Based on Equation (5) above, the minimum number p of FE stages 310 in the 8 by 8 MIMO system is two. That is, when the number of FE stages 310 is greater than two, the 8 by 8 MIMO system may maintain optimal performance. However, in a MIMO system of high order and many antennas, the minimum number of FE stages 310 increases and thus the implementation complexity increases. Hence, an embodiment of the present disclosure provides an apparatus and a method for reducing the implementation complexity by reducing the minimum number of FE stages 310 as determined based on Equation (5) in the MIMO system of high order and many antennas.

Referring to FIG. 6, in the 8 by 8 MIMO system, i=n and n is 8. In this case, the optimal performance of the detected signal requires at least two FE stages 610 based on Equation (5) above. However, a single FE stage 610 is shown in FIG. 6. That is, the 8 by 8 MIMO system includes a single FE stage 610 and seven SE stages 650. When the number of FE stages 610 reduces from two to one, a considerable gain may be attained in implementation complexity. For example, every time the number of FE stages 610 decreases by one in the 8 by 8 MIMO, 64 quadrature amplitude modulation (QAM) system, the implementation complexity is reduced by 64 times. As another example, every time the number of the FE stages 610 decreases by one in the 8 by 8 MIMO, 256 QAM system, the implementation complexity is reduced by 256 times. As such, the reduction of FE stages 610 may be quite advantageous in reducing the implementation complexity, but the reliability of the detected signal reduces. Hence, the present disclosure applies the LR to improve the reliability of the detected signal. The LR may increase the reliability of the detected signal but also increase the implementation complexity. However, since the implementation complexity based on the reduction of FE stages 610 is reduced, the implementation complexity may be greatly reduced and the reliability of the detected signal may be improved on the whole system.

Figure 7:
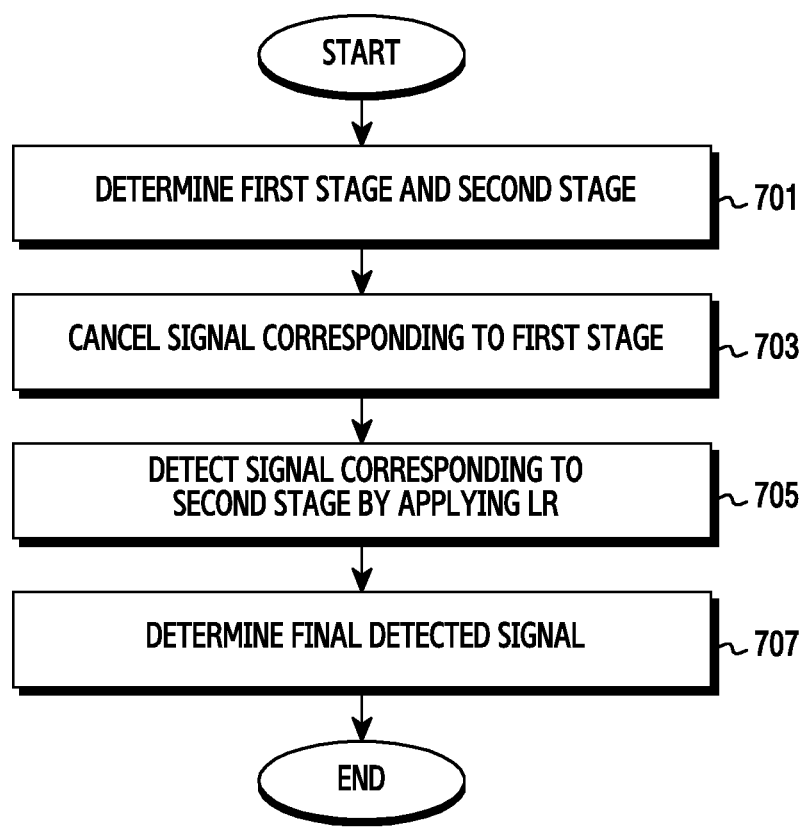
FIG. 7 is a flowchart of a signal detection method including determining a first stage and a second stage in a MIMO system, according to an embodiment of the present disclosure.

FIG. 7 is a flowchart of a signal detection method including determining a first stage and a second stage in a MIMO system according to an embodiment of the present disclosure.

The method of FIG. 7 may be carried out by the control unit 250 of FIG. 2. An electronic device including a plurality of antennas may define two stages for the receive signal detection in step 701. The first stage may correspond to the FE stage 310 and the second stage may correspond to the SE stage 350 in FIG. 3. Herein, as the preprocessing for the second stage, the channel ordering may be conducted. The channel ordering may be performed based on Equation 4 above. The 8 by 8 MIMO system includes two first stages and six second stages based on Equation (5) above. However, Equation (5) increases the number of first stages in the MIMO system of high order and many antennas, and thus the implementation complexity greatly increases. Hence, an embodiment of the present disclosure provides for a reduction in the number of first stages. That is, the 8 by 8 MIMO system may include a single first stage and is not limited to Equation (5).

Referring to FIG. 7, in step 703, the electronic device cancels a signal corresponding to the first stage in the received signal. More specifically, the electronic device may perform the channel ordering on the signal received via the antennas, and then expand and remove all of the signals corresponding to the first stage. The signal corresponding to the first stage may be removed based on Equation (6) above. All of the signals corresponding to the first stage are expanded and removed because the symbol constellation domain is moved to the LR domain after the LR application and it is difficult to generate candidate vectors unlike the traditional FSD algorithm. That is, after the LR, the conventional tree search may be impractical.

In step 705, the electronic device detects a signal corresponding to the second stage by applying the LR. The LR may be conducted based on Equation (7) above. The LR may convert the column vector which is the basis vector of the lattice space, to the basis vector with favorable properties (such as orthogonality). That is, the LR may make the basis vectors orthogonal and thus the Euclidean space may be expanded. As the Euclidean space is expanded, the maximum noise range without errors may expand. As a result, the LR may improve the reliability of the detected signal. According to an embodiment of the present disclosure, the linear detection may be applied to detect the signal corresponding to the second stage. The MMSE-SIC may be applied to detect the signal corresponding to the second stage.

In step 707, the electronic device determines a final detected signal. To determine a final detected signal, the electronic device may generate candidates of the final detected signal by combining the signal corresponding to the second stage detected in step 705 with candidates of the signal corresponding to the first stage. The candidates of the final detected signal may be generated as shown in FIG. 3. The electronic device may measure Euclidean distances between the generated candidates of the final detected signal and the received signal, and determine the candidate with the shortest Euclidean distance as the final detected signal. The final detected signal may be selected from the candidates based on Equation (3) above.

Figure 8:
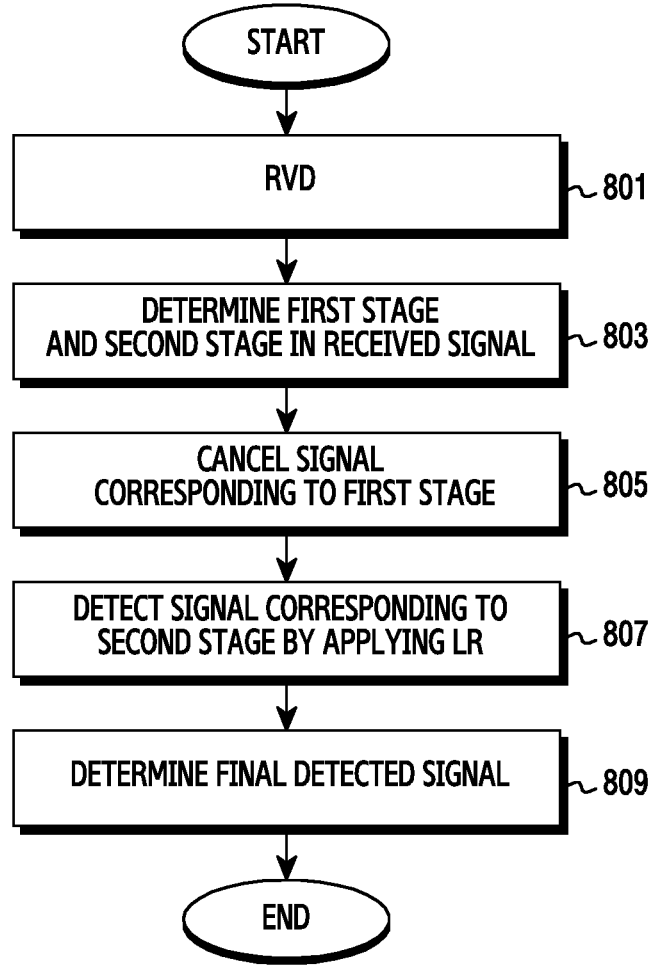
FIG. 8 is a flowchart of a signal detection method including real value decomposition (RVD) in a MIMO system, according to an embodiment of the present disclosure.

FIG. 8 is a flowchart of a signal detection method including RVD in a MIMO system according to an embodiment of the present disclosure.

The method of FIG. 8 may be carried out by the control unit 250 of FIG. 2. The received signal of the MIMO system model of FIG. 1 may be defined based on Equation (1) above. However, the complex computation in the MIMO system exhibits low flexibility in selecting the number of first stages (or the FE stages 310) and reduced hardware implementation. Accordingly, the electronic device may perform the RVD on the received signal expressed as Equation 1 in step 801. The RVD may be conducted based on Equation (2). The RVD may enhance the flexibility in selecting the number of first stages (or the FE stages 310). In addition, the RVD may reduce the hardware implementation by expressing and calculating Equation (1) in the real-numbered domain.

For the flexibility improvement of implementation, when a 4 by 4 MIMO system does not apply the RVD, Equation (5) may determine at least one first stage. In this case, the number of first stages is not further reduced to reduce the implementation complexity. That is, there is no flexibility in selecting the number of FE stages 310. However, when the RVD is applied, the original 4 by 4 MIMO system may attain the received signal equation similar to the 8 by 8 MIMO system. That is, Equation (1) of an x-by-x MIMO system may be converted to Equation (1) of a 2*x-by-2*x MIMO system. Hence, Equation (5) for defining the minimum number of FE stages 310 may be re-expressed as Equation (8).

$$(2*n_R - 2*n_T)(p+1) + (p+1)^2 \geq 2*n_R \qquad (8)$$

$n_R$ denotes the number of the transmit antennas, and $n_T$ denotes the number of the receive antennas. p denotes the minimum number of FE stages 310 satisfying Equation 8. p is an integer greater than or equal to 1. As a result, for example, when the 4 by 4 MIMO system applies the RVD, p may become 2. Thus, the number of FE stages 310 may be adjusted to 1 or 2. As such, the RVD may increase the flexibility in determining the number of FE stages 310.

In step 803, the electronic device including the plurality of antennas defines two stages for the receive signal detection. The first stage may correspond to the FE stage 310 and the second stage may correspond to the SE stage 350 in FIG. 3. Herein, as the preprocessing for the second stage, the channel ordering may be performed. The channel ordering may be performed based on Equation (4) above. According to an embodiment of the present disclosure, when the 4 by 4 MIMO system applies the RVD, Equation (8) may define two first stages and six second stages. When the 8 by 8 MIMO system does not apply the RVD (the RVD is not essential in step 801), Equation (5) may define two first stages and six second stages. However, Equation (5) and Equation (8) increase the minimum number of first stages in the MIMO system of high order and many antennas and thus increases the implementation complexity. Hence, an embodiment of the present disclosure provides for a reduction in the number of first stages. That is, the 8 by 8 MIMO system may include a single first stage and is not limited to Equation (5).

In step 805, the electronic device cancels a signal corresponding to the first stage in the entire received signal. More specifically, the electronic device may perform the channel ordering on the signal received via the antennas, and then expand and remove all signals corresponding to the first stage. Herein, the channel ordering may be performed based on Equation (4) above. The signal corresponding to the first stage may be removed based on Equation (6) above. All of the signals corresponding to the first stage are expanded and removed because the symbol constellation domain is moved to the LR domain after the LR application and it is difficult to generate candidate vectors unlike the traditional FSD algorithm. That is, after the LR, the conventional tree search may be impractical.

In step 807, the electronic device detects a signal corresponding to the second stage by applying the LR. The LR may be conducted based on Equation (7) above. The LR may convert the column vector which is the basis vector of the lattice space, to the basis vector with favorable properties, such as orthogonality. That is, the LR may make the basis vectors orthogonal and thus the Euclidean space may be expanded. As the Euclidean space is expanded, the maximum noise range without errors may expand. As a result, the LR may be used to detect the signal corresponding to the second stage and improve the reliability of the detected signal. According to an embodiment of the present disclosure, the linear detection may be applied to detect the signal corresponding to the second stage. The MMSE-SIC may be applied to detect the signal corresponding to the second stage.

In step 809, the electronic device determines a final detected signal. To determine a final detected signal, the electronic device may generate candidates of the final detected signal by combining the signal corresponding to the second stage detected in step 807 with candidates of the signal corresponding to the first stage. The candidates of the final detected signal may be generated as shown in FIG. 3. The electronic device may measure Euclidean distances between the candidates of the final detected signal and the received signal, and determine the candidate with the shortest Euclidean distance as the final detected signal. The final detected signal may be selected from the candidates based on Equation (3) above.

Herein, the 4 by 4 MIMO system or the 8 by 8 MIMO system is described by way of example. Accordingly, it is noted that the present disclosure is not limited and is applicable to other high-order MIMO systems.

Figure 9:
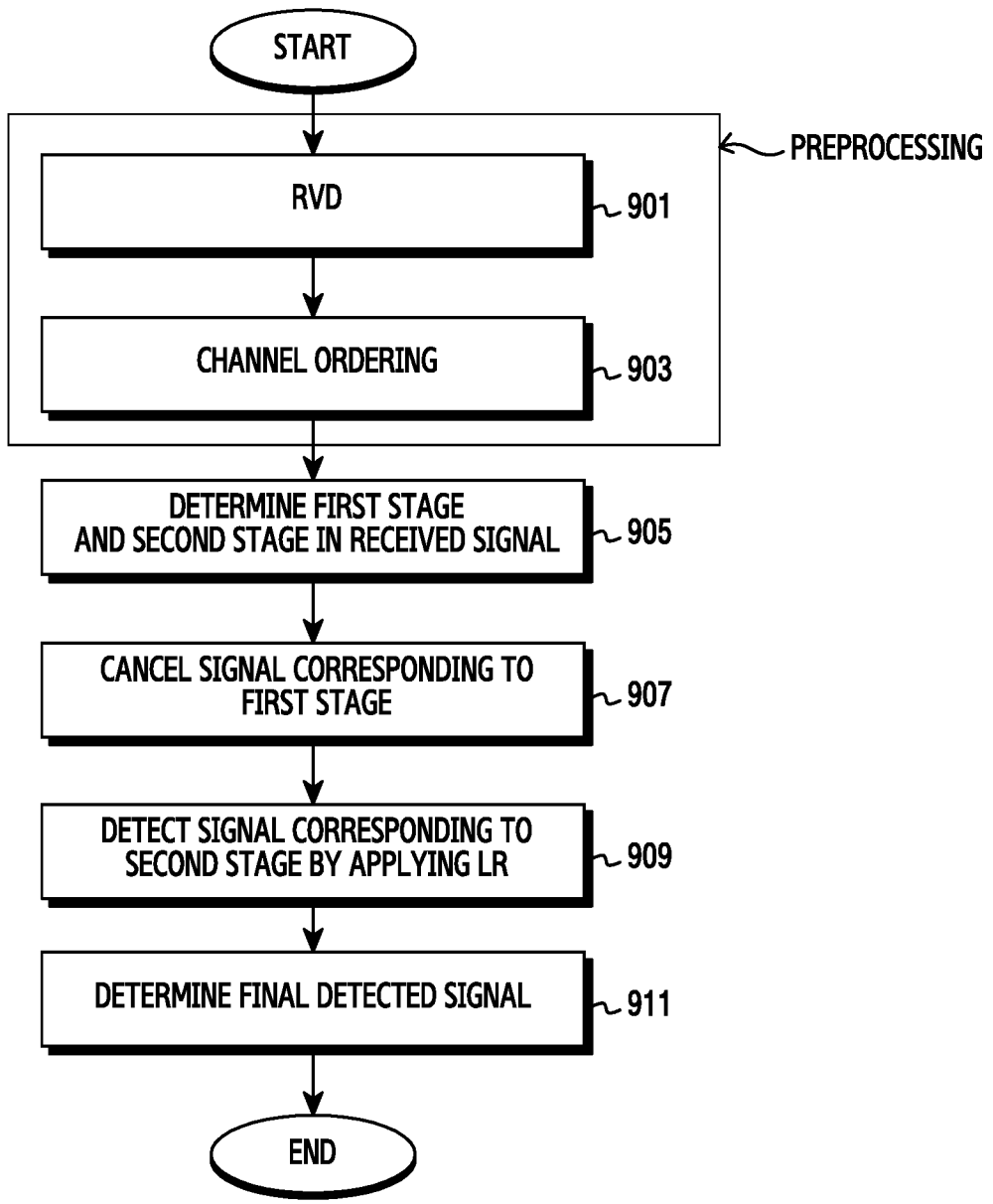
FIG. 9 is a flowchart of a signal detection method in a MIMO system, according to an embodiment of the present disclosure.

FIG. 9 is a flowchart of a signal detection method in a MIMO system according to an embodiment of the present disclosure.

The method of FIG. 9 may be carried out by the control unit 250 of FIG. 2. Referring to FIG. 9, the electronic device performs RVD 901 and channel ordering 903 as the preprocessing of the received signal. The RVD 901 obtains flexibility in selecting the number of FE stages, facilitates the reduced hardware implementation, and may be conducted based on Equation (2) above. The channel ordering 903 is conducted in descending order of the FE stage reliability, and in ascending order of the SE stage reliability in order to minimize any error propagation. The channel ordering may be conducted based on Equation (4) above.

In step 905, the electronic device, including a plurality of antennas, defines two stages for the receive signal detection. The first stage may correspond to the FE stage 310 and the second stage may correspond to the SE stage 350 in FIG. 3. According to an embodiment of the present disclosure, when the 4 by 4 MIMO system applies the RVD 901, Equation (8) may define two first stages and six second stages. When the 8 by 8 MIMO system does not apply the RVD (that is, the RVD is not essential in step 901), Equation (8) may define two first stages and six second stages. However, Equation (5) and Equation (8) increase the minimum number of first stages in the MIMO system of high order and many antennas, and thus the implementation complexity increases. Hence, an embodiment of the present disclosure provides for a reduction of the number of first stages. That is, the 8 by 8 MIMO system may include a single first stage and is not limited to Equation (5).

In step 907, the electronic device cancels a signal corresponding to the first stage in the entire received signal. More specifically, the electronic device may perform the channel ordering 903 on the signal received via the antennas, and then expand and remove all of the signals corresponding to the first stage. The signal corresponding to the first stage may be removed based on Equation (6) above. All of the signals corresponding to the first stage are expanded and removed because the symbol constellation domain is moved to the LR domain after the LR application and it is difficult to generate candidate vectors unlike the traditional FSD algorithm. That is, after the LR, the conventional tree search may be impractical.

In step 909, the electronic device detects a signal corresponding to the second stage by applying the LR. The electronic device may apply QR decomposition as the preprocessing of the signal detection corresponding to the first stage. Herein, Q is an n-by-n orthogonal matrix and R is an upper triangle matrix. The LR may be conducted based on Equation (7) above. The LR may convert the column vector which is the basis vector of the lattice space, to the basis vector with favorable properties, such as orthogonality. That is, the LR may make the basis vectors orthogonal and thus the Euclidean space may be expanded. As the Euclidean space is expanded, the maximum noise range without errors may expand. As a result, the LR may be used to detect the signal corresponding to the second stage and improve the reliability of the detected signal. According to an embodiment of the present disclosure, the linear detection may be applied to detect the signal corresponding to the second stage. The MMSE-SIC may be applied to detect the signal corresponding to the second stage.

In step 911, the electronic device determines a final detected signal. To determine a final detected signal, the electronic device may generate candidates of the final detected signal by combining the signal corresponding to the second stage detected in step 909 with candidates of the signal corresponding to the first stage. The candidates of the final detected signal may be generated as shown in FIG. 3. The electronic device may measure Euclidean distances between the candidates of the final detected signal and the received signal, and determine the candidate with the shortest Euclidean distance as the final detected signal. The final detected signal may be selected from the candidates based on Equation (3) above.

Herein, the 4 by 4 MIMO system or the 8 by 8 MIMO system is disclosed merely by way of example. Accordingly, it is noted that the present disclosure is not limited and is applicable to other high-order MIMO systems.

Figure 10A:
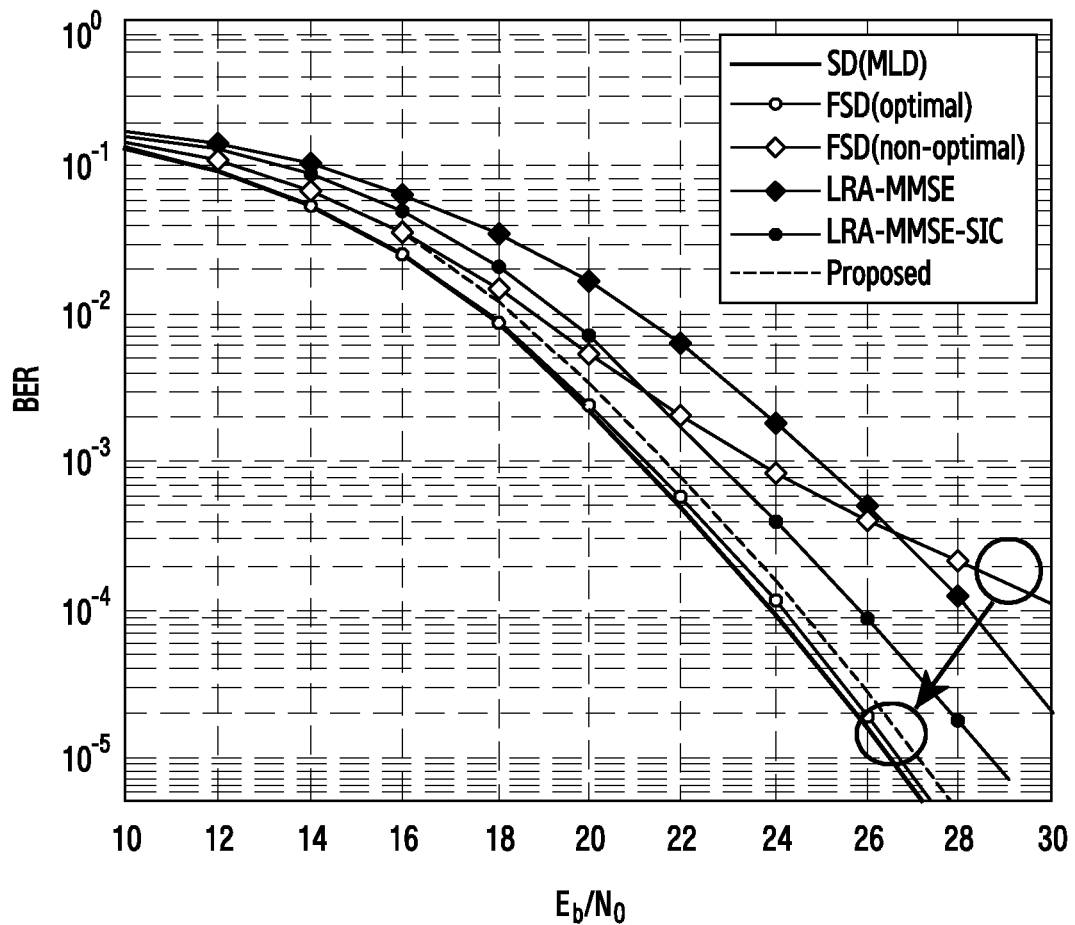
FIG. 10A is a diagram illustrating performance of detection algorithms in a MIMO system, according to an embodiment of the present disclosure.
Figure 10B:
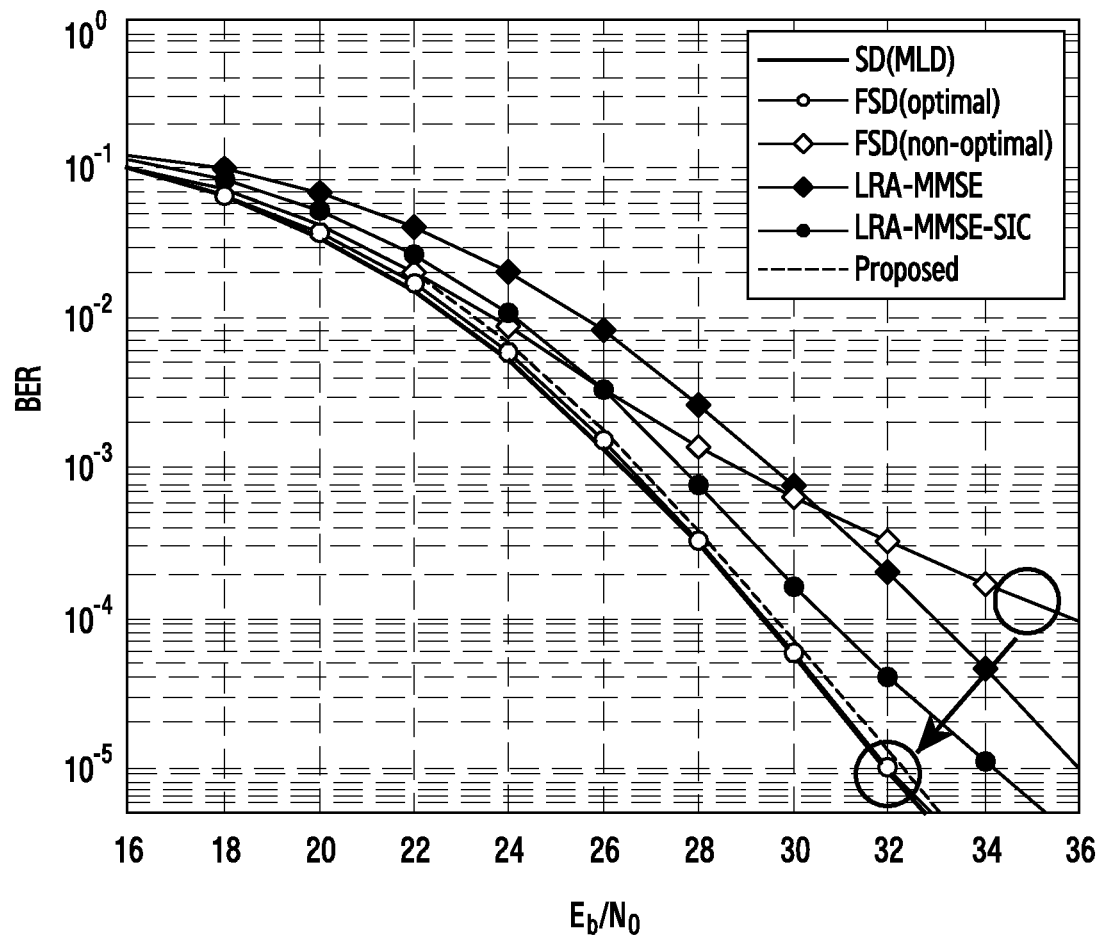
FIG. 10B is another diagram illustrating performance of detection algorithms in a MIMO system, according to an embodiment of the present disclosure.

FIG. 10A is a diagram illustrating performance of detection algorithms in a MIMO system, according to an embodiment of the present disclosure FIG. 10B is another diagram illustrating performance of detection algorithms in a MIMO system, according to an embodiment of the present disclosure.

FIGS. 10A and 10B depict performance results from an experiment for detecting effects in a MIMO system according to an embodiment of the present disclosure. A simulation is conducted with a 4 by 4 MIMO system, and perfect channel estimation at the receiver is assumed. A transmit signal is modulated with 64 QAM or 256 QAM, and performances of the traditional SD, FSD, lattice reduction aided (LRA)-MMSE, and LRA-MMSE-SIC are also shown for the sake of performance comparison.

FIG. 10A shows simulated performance results in a 4 by 4, 64 QAM MIMO system. A horizontal axis indicates the energy per bit to noise power spectral density ratio ($E_b/N_o$), and a vertical axis indicates a bit error rate (BER). The present LRA-MMSE-FSD algorithm exhibits a performance similar to the optimal performance of the traditional SD and FSD.

FIG. 10B shows simulated performance results in a 4 by 4, 256 QAM MIMO system. The present LRA-MMSE-FSD algorithm exhibits nearly the same performance as the optimal performance of the traditional SD and FSD.

The above-described methods according to claims and/or various embodiments of the present disclosure may be implemented in software, firmware, hardware, or in combinations thereof.

A non-transitory, computer-readable storage medium storing one or more programs (software modules) may be provided. One or more programs stored in the non-transitory, computer-readable storage medium may be configured for execution by one or more processors of the electronic device. One or more programs may include instructions for controlling the electronic device to execute the methods according to the embodiments of the present disclosure.

Such a program (software module, software) may be stored in a random access memory, a non-volatile memory including a flash memory, a read only memory (ROM), an electrically erasable programmable ROM (EEPROM), a magnetic disc storage device, a compact disc (CD)-ROM, digital versatile discs (DVDs), other optical storage devices, or a magnetic cassette. Alternatively, the programs may be stored in a memory combining a part or all of the recording media above. A plurality of memories may also be equipped.

The programs may be stored in an attachable storage device accessible via a communication network such as the Internet, Intranet, local area network (LAN), WLAN, or storage area network (SAN), or a communication network by combining these networks. The storage device may access the electronic device through an external port. A separate storage device may access the electronic device over the communication network.

As set forth above, by reducing the number of candidate vectors in the high-order MIMO antenna system, the performance of the traditional FSD algorithm may be maintained and a reduction in implementation complexity may be achieved.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device in a wireless communication system, the device comprising:
    at least one transceiver configured to receive a signal; and
    at least one processor configured to:
        remove each of candidates of a first signal corresponding to a first stage from the received signal;
        detect a second signal corresponding to a second stage by applying lattice reduction; and
        determine a final detected signal by using the detected second signal and the candidates of the first signal,
        wherein the first stage corresponds to a full expansion stage, and the second stage corresponds to a single expansion stage.

2. The electronic device of claim 1, wherein the at least one processor, in order to determine the final detected signal, is further configured to:
    detect total candidates by combining the detected second signal with each of the candidates of the first signal; and
    determine the final detected signal based on Euclidean distances between the received signal and the total candidates.

3. The electronic device of claim 1, wherein the at least one processor is further configured to determine the first stage and the second stage based on channel reliability, wherein channel reliability corresponding to the first stage is lower than channel reliability corresponding to the second stage.

4. The electronic device of claim 1, wherein the at least one processor is further configured to reduce a number of levels of the first stage.

5. The electronic device of claim 4, wherein the number of the levels of the first signal is less than or equal to a minimum p satisfying, $$(n_R-n_T)(p+1)+(p+1)^2 \geq n_R$$

where $n_T$ denotes a number of transmit antennas, $n_R$ denotes a number of receive antennas, p denotes the number of the levels of the first stages satisfying the above equation, and p is an integer greater than or equal to 1.

6. The electronic device of claim 4, wherein the at least one processor is further configured to perform real value decomposition (RVD) on the received signal, and
    wherein the number of the levels of the first stage is less than or equal to a minimum p satisfying, $$(2*n_R-2*n_T)(p+1)+(p+1)^2 \geq 2*n_R$$

where $n_T$ denotes a number of transmit antennas, $n_R$ denotes a number of receive antennas, p denotes the number of the levels of the first stages satisfying the above equation, and p is an integer greater than or equal to 1.

7. The electronic device of claim 1, wherein the at least one processor, in order to remove each of the candidates, is configured to:
    expand all of the candidates of the first signal; and
    remove each of the candidates of the first signal from the received signal.

8. The electronic device of claim 1, wherein the at least one processor is configured to detect the second signal corresponding to the second stage using at least one of linear detection and successive interference cancellation (SIC) detection.

9. The electronic device of claim 1, wherein the at least one processor is further configured to perform orthogonal/upper triangle matrix (QR) decomposition.

10. The electronic device of claim 1, wherein the lattice reduction is applied to a signal in which each of the candidates is removed from the received signal.

11. A method for detecting a received signal of an electronic device in a wireless communication system, comprising:
    removing each of candidates of a first signal corresponding to a first stage from the received signal;
    detecting a second signal corresponding to a second stage by applying lattice reduction; and
    determining a final detected signal by using the detected second signal and the candidates of the first signal,
    wherein the first stage corresponds to a full expansion stage, and the second stage corresponds to a single expansion stage.

12. The method of claim 11, wherein determining the final detected signal comprises:
    detecting total candidates by combining the detected second signal with each of the candidates of the first signal; and
    determining the final detected signal based on Euclidean distances between the received signal and the total candidates.

13. The method of claim 11, further comprising:
    determining the first stage and the second stage based on channel reliability, wherein channel reliability corresponding to the first stage is lower than channel reliability corresponding to the second stage.

14. The method of claim 11, further comprising:
    reducing a number of levels of the first stage.

15. The method of claim 14, wherein the number of levels of the first stage is less than or equal to a minimum p satisfying, $$(n_R-n_T)(p+1)+(p+1)^2 \geq n_R$$

where $n_T$ denotes a number of transmit antennas, $n_R$ denotes a number of receive antennas, p denotes the number of the levels of the first stages the above equation, and p is an integer greater than or equal to 1.

16. The method of claim 14, wherein reducing the number of the levels of the first stage comprises:
    performing real value decomposition (RVD) on the received signal, and
    wherein the number of the levels of the first stage is less than or equal to a minimum p satisfying, $$(2*n_R-2*n_T)(p+1)+(p+1)^2 \geq 2*n_R$$

where $n_T$ denotes a number of transmit antennas, $n_R$ denotes a number of receive antennas, p denotes the number of the levels of the first stage satisfying the above equation, and p is an integer greater than or equal to 1.

17. The method of claim 11, wherein removing each of the candidates comprises:
- expanding all of the candidates of the first signal; and
- removing each of the candidates of the first signal from the received signal.

18. The method of claim 11, wherein detecting the second signal comprises detecting the second signal using at least one of linear detection and successive interference cancellation (SIC) detection.

19. The method of claim 11, further comprising:
- performing orthogonal/upper triangle matrix (QR) decomposition.

20. The method of claim 11, wherein the lattice reduction is applied to a signal in which each of the candidates is removed from the received signal.

* * * * *